United States Patent
Voser et al.

(12) United States Patent Voser et al.
(10) Patent No.: US 6,172,745 B1
(45) Date of Patent: Jan. 9, 2001

(54) SENSING DEVICE

(75) Inventors: Christian Voser, Onex; Didier Rossel, Grand-Lancy, both of (CH); Bernard Bouchet, Monnetier Mornex (FR)

(73) Assignee: Mars Incorporated, McLean, VA (US)

( * ) Notice: Under 35 U.S.C. 154(b), the term of this patent shall be extended for 0 days.

(21) Appl. No.: 09/101,435

(22) PCT Filed: Jan. 16, 1997

(86) PCT No.: PCT/IB97/00059

§ 371 Date: Oct. 15, 1998

§ 102(e) Date: Oct. 15, 1998

(87) PCT Pub. No.: WO97/26626

PCT Pub. Date: Jul. 24, 1997

(30) Foreign Application Priority Data

Jan. 16, 1996 (GB) .................................................. 9600853

(51) Int. Cl.[7] .................................................. G06K 9/74
(52) U.S. Cl. .............................................. 356/71; 445/448
(58) Field of Search .............................. 356/71, 445, 448

(56) References Cited

U.S. PATENT DOCUMENTS

| | | |
|---|---|---|
| 4,204,765 | 5/1980 | Iannadrea et al. . |
| 4,319,137 | 3/1982 | Nakamura et al. . |
| 4,386,268 | 5/1983 | Kock . |
| 4,525,630 | 6/1985 | Chapman . |
| 4,592,090 | 5/1986 | Curl et al. . |
| 4,736,099 | 4/1988 | Zelenka . |
| 4,881,268 | 11/1989 | Uchida et al. . |
| 4,922,109 | 5/1990 | Bercovitz et al. . |
| 5,034,616 | 7/1991 | Bercovitz . |
| 5,260,582 | 11/1993 | Danek et al. . |
| 5,304,813 | 4/1994 | De Man . |
| 5,399,874 | 3/1995 | Gonsalves et al. . |
| 5,416,307 | 5/1995 | Danek et al. . |
| 5,446,816 | 8/1995 | Shiraishi et al. . |
| 5,468,971 | 11/1995 | Ebstein et al. . |

FOREIGN PATENT DOCUMENTS

| | | |
|---|---|---|
| 3 705 870 C1 | 12/1987 | (DE) . |
| 37 05 870 C1 | 12/1987 | (DE) . |
| 0 078 708 | 5/1983 | (EP) . |
| 0 198 819 | 10/1986 | (EP) . |
| 62-086323 | 4/1987 | (JP) . |
| WO 93/07590 | 4/1993 | (WO) . |
| WO 97/26626 | 7/1997 | (WO) . |

OTHER PUBLICATIONS

Armatic AL.07 Instruction Manual, Dec. 1988, Contents Page and pp. 14–15.
Aramatic AL.07 Programming Instruction Sheet, Oct. 1988.

*Primary Examiner*—Frank G. Font
*Assistant Examiner*—Reginald A. Ratliff
(74) *Attorney, Agent, or Firm*—Fish & Richardson (57) ABSTRACT

An optical head (4) for sensing banknotes using six different groups of light sources, namely LEDs generating light at six different wavelengths both in the visible range of the spectrum and in the infra-red range of the spectrum. Unitary light guides (16,18) define the path between linear arrays (8,10) of the LEDs and the surface of a banknote (2). Diffusely reflected light is separately collected by a pin diode detector array (12). Both the LEDs and the detectors are commonly mounted on a single printed circuit board (14). The light sources (8,10) are arranged to shine directly into the light-receiving end of each light guide, which are unitary and allow the light to mix and spread within in order to provide a homogeneous illumination. The detectors (12) are optically isolated and detect discrete areas on the banknote transport path.

33 Claims, 4 Drawing Sheets

SENSING DEVICE

BACKGROUND

This invention relates to a sensing device, in particular but not exclusively for use in sensing the optical characteristics of a document moving relative to the sensing device in a transport path.

Such devices are used for the validation of banknotes.

International patent application No. WO 93/07590 describes a banknote validator in which a transverse strip on a banknote path is illuminated by light from a multi-colour transmitting station by a unitary light guide. Light reflected from a banknote is returned via the same light guide to a light receiving station. It is not possible with this banknote validator to properly sense discrete areas on the illuminated strip, since the light returning to the light receiving station is mixed across the width of the light guide. Only the optical characteristics of the banknote across its whole width are used for validation.

Another known type of banknote validator is the Armatic AL07 validator. A pair of single light guides in this arrangement deliver light from different groups of monochromatic LEDs (green, yellow, red and infra-red), and the reflected light is collected and sensed via the same light guide. The reading detectors are spaced amongst the LEDs arranged in a linear array at the distal end of each of the light guides. Again, all of the reading photo-transistors receive light reflected from all across the illuminated strip of banknote, and the optical characteristics of discrete areas of the banknote are not discernable. The arrangement is used in such a way that the spectral response received from the banknote is integrated over the whole banknote.

U.S. Pat. No. 4,922,109 describes a reading head which includes a number of reading modules. Light from a single source located externally of the array modules is delivered to illuminated strips on the transport path by light guides symmetrically arranged around the detector arrays of the sensing modules. The single while light source can be replaced by providing a monochromatic light source for each module, but still each module senses only one spectral response characteristic of a banknote.

Optical sensing apparatus suitable for validating banknotes is also described in U.S. Pat. No. 5,304,813. The apparatus consists of a linear array of photodetectors whose optical axes create a single sensor plane perpendicular to a transfer path for a banknote. The banknote is illuminated by two linear arrays of light sources located above the transfer path, whose optical axes form planes inclined to both the sensor plane and the transfer path. The light sources consist of a number of groups of sources, each group generating light of a different wavelength, arranged in a repetitive colour sequence in each of the linear source arrays. An optically diffractive element can be placed in front of each of the source arrays to effect a more uniform distribution of light intensity in the illuminated region on the transfer path. A further linear array of light sources is placed on the underside of the transfer path, arranged to lie in the sensor plane so that the sensors can be exposed to light transmitted through a banknote travelling along the transfer path.

The different groups of light sources are energised in rapid succession to illuminate a banknote passing along the transfer path with different wavelengths of light in sequence. The response of the banknote to the light of the different respective parts of the spectrum is sensed by the detector array. Because each of the photodetectors in the array receives light from a different area on the banknote, the spectral response of the different sensed parts of the banknote can be determined and compared with stored reference data to validate the banknote.

This prior art arrangement is adequate, particularly when the arrangement is used in a banknote validator in which the banknote is mechanically aligned with a lateral edge of the transport mechanism before sensing of the banknote surface. Thus, the arrangement is designed for the validation of banknotes at a limited rate.

It would be desirable to provide an alternative apparatus, in particular one which is suitable for use in the verification of banknotes at higher transport speeds, of up to 2 m/s or in that order of magnitude, and at a range of skew and offset orientations on a transport path. Such an apparatus could be utilised in a high-speed automatic teller machine.

As will be appreciated from the description which follows, the arrangement of the components of an optical sensing device and in particular the homogeneity of illumination produced thereby during sensing, is an important factor in the achievement of a practical high-speed validator in which the optical characteristics of discrete areas of a banknote are sensed.

SUMMARY

According to one aspect of the present invention there is provided a sensing device for sensing the detector characteristics of a document moving relative to the sensing device in a transport path, said device comprising a plurality of groups of light sources, each said group generating light of a different wavelength and the light sources of each said groups being spaced across a light-generating area optically coupled to said transport path by a first light path, a plurality of light detectors spaced across a light-detecting area optically coupled to said transport path by a second light path different to said first light path, said light detectors being arranged to receive light from a plurality of discrete detection areas on said transport path, and a unitary light guide defining at least part of said first light path, said light guide having a light-receiving end, reflective sides, and a light-emitting end, wherein the said light-generating area is coupled to the light-receiving end of the light guide, the light guide conveying light generated by each of said light sources towards said transport path.

A unitary light guide allows the light from light sources within a group to spread and mix within the light guide, so that the light emerging from the light-emitting end of the light guide may approach a uniform intensity across the width of the light guide.

The use of the unitary light guide which forms part of a first light path coupling to the light generating area to the transport path, and a light detecting area optically coupled to the transport path by a second light path different to the first light path provides that an area on the transport path can be illuminated with a homogeneous light distribution whilst also allowing the detectors to discriminate between a plurality of discrete areas on the transport path.

The field of view of each of the light detectors may be restricted by light shielding means locate between the detectors and the transport path, which reduces the mixing of light from a discrete area being detected by one detector, with that being detected by adjacent detectors.

The light guide may define an indirect path between the light sources and the part of the transport path being detected, so as to ensure that light is reflected within the light guide at least once before impinging on the sensed part of a banknote, thereby to increase the light spreading and mixing effect of the light guide.

The light sources may be unencapsulated LEDs, which allows for an increased coupling efficiency between the LEDs and the light-receiving end of the light guide. This effect is further achieved by providing that the light sources may be optically coupled to the light-receiving end of the light guide via a substance, such as a gel, having a refractive index generally matched to that of the light guide.

The outer surface of the light-receiving end of the light guide adjacent said light sources may follow a generally convex profile in cross section, so as to focus said light sources into the light guide. This arrangement also provides for a greater coupling efficiency between the light guides and the light sources.

Light guides utilised in other prior art arrangements rely on mismatched refractive index boundaries to ensure total internal reflection within the guides. A difficulty associated with these prior art arrangements is that defects in the reflective properties of the light guide sides are created when the light guides contact adjacent surfaces or fixings. The unitary light guide of the invention preferably has at least one metallised surface. By using light guides which have a metallised surface, physical contact, for example of supports, with the surface in questions has far less effect on the reflective properties of the light guide sides.

The light sources may be arranged in a linear array, with said light guides having metallised sides located adjacent each end of said linear array. This increases the homogeneity of illumination provided at the light-emitting ends of the light guides by reducing end effects. A series of virtual sources is thus produced at each of the adjacent sides, which mirror the light distribution produced directly by the source arrays.

Each of said groups of light sources is preferably arranged to be energised during a detector illumination period associated with each of said detectors, each said detector being illuminated in turn. By this mode of operation, the entire spectral range of information achieved by sensing with the different colour groups is more closely associated with a discrete detection area then would be the case if all detector outputs were sensed in sequence illumination by each colour group in turn.

The light detectors may be arranged on a common substrate such as a printed circuit board, which provides for a simple and cost-effective arrangement.

A control unit and/or amplifying means for said light detectors may be mounted on the same printed circuit board. This allows these components to be located in close proximity, thereby reducing the creation of noise on the signal lines.

A further aspect of the invention provides a device for sensing the optical characteristics of a document having relative to the device in a transport path, comprising a plurality of light sources, a unitary light guide optically coupling said light sources to one side of said transport path, and a plurality of detectors optically coupled to the same side of the transport path externally of said light guide to receive light from said light sources when reflected from a document travelling along said transport path.

A yet further aspect of the invention provides a sensing device comprising: position-sensing means for sensing the position of a banknote travelling along a transport path; a plurality of detectors for sensing a characteristic of the banknote in different regions spaced across said transport path; and processing means connected to said detectors so as to be capable of processing the outputs of one or more of said detectors in a plurality of possible combinations, said processing means being arranged to select one of said possible combinations, responsive to said position-sensing means, for use in judging said banknote. This arrangement provides for the judgement of a document, such as a banknote, which may be transported in various skew and/or offset positions, on the basis of characteristics sensed in a discrete area of the document.

BRIEF DESCRIPTION OF DRAWINGS

All other aspects and advantages of the invention will be appreciated on consideration of the following description of a preferred embodiment of the invention given by way of example only with reference to the accompany drawings, in which.

DETAILED DESCRIPTION

Figures 1, 2:
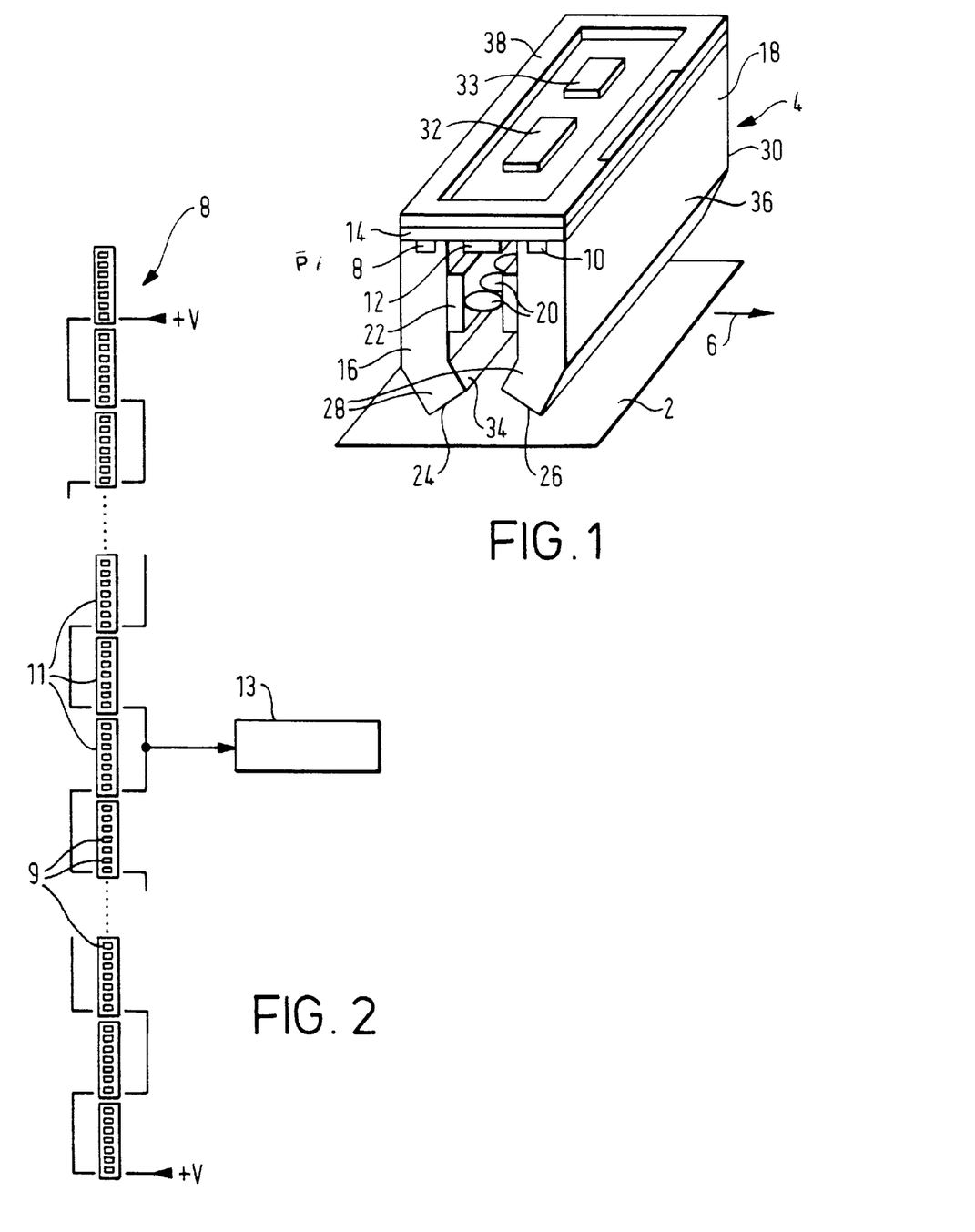
FIG. 1 schematically illustrates an optical sensing device according to an embodiment of the invention.
FIG. 2 schematically illustrates the power-delivery arrangement for a light source array used in the arrangement of FIG. 1.

Referring first to FIG. 1, a banknote 2 is sensed by an optical sensing module 4 as it passes along a predetermined transport plane in the direction of arrow 6.

The sensing module 4 has two linear arrays of light sources 8, 10 and a linear array of photodetectors 12 directly mounted on the underside of a printed circuit board 14. A control unit 32 and first stage amplifiers 33 for each of the photodetectors are mounted directly on the upper surface of the printed circuit board 14.

Printed circuited board 14 is provided on its upper surface, around its peripheral edges, with a frame 38 made of a rigid material such as metal. This provides the printed circuit board, made of a fibre-glass composite, and the source and detector components mounted on its underside, with a high degree of linearity and uniformity across its width and length. The frame 38 is provided with a connector 40 whereby the control unit 32 communicates with other components (not shown) of the banknote validating apparatus, such as a position sensor, a banknote sorting mechanism, an external control unit and the like.

The optical sensing module 4 has two unitary light guides 16 and 18 for conveying light produced by source arrays 8 and 10 towards, and directing the light onto, a strip of the banknote 2. The light guides 16 and 18 are made from a moulded plexiglass material.

Each light guide is elongate and rectangular in horizontal cross section and consists of an upper vertical portion and a lower portion which is angled, for example at 30°, with respect to the upper portion and which is of sufficient length to ensure that light emitted from source arrays 8 and 10 does not directly impinge on the areas of the banknote 2 which are sensed by the detector array 12. Light, once emitted, is internally reflected at least once within the light guide 16 or 18. The angled lower portions of the light guides direct the light towards an illuminated strip on the banknote 2 which is centrally located between the light guides 16 and 18, and which is centred on a plane defined by the optical area of the detector array 12.

Optical means, such as lenses 20, are mounted between the light guides, in a linear array coincident with the vertical detector plane. One lens 20 is provided per detector in the detector array 12. Each lens 20 delivers light collected from a discrete area on the banknote, larger than the effective area of a detector, to the corresponding detector. The lenses 20 are fixed in place by an optical support 22 located between the light guides 16 and 18.

The light-emitting ends 24 and 26 of the light guides 16 and 18, and the lenses 20, are arranged so that only diffusely-reflected light is transmitted to the detector array 12.

The lateral ends 28 and 30, and the inner and outer sides 34 and 36 of the light guides 16 and 18 are polished and metallised.

Although not evident from FIG. 1, each source array 8 and 10, the detector array 12 and the linear lens array 20, all extend across the width of the light guides 16 and 18, from one lateral side 28 to the other, so as to be able to sense the reflective characteristics of the banknote 2 across its entire width.

The light detector array 12 is made up of a linear array of a large number of, for example thirty, individual detectors, for example pin diodes, which each sense discrete parts of the banknote 2 located along the strip illuminated by the light guides 16 and 18. Adjacent detectors, supplied with diffusely reflected light by respective adjacent lenses 20, detect adjacent, and discrete areas of the banknote 2.

Reference is made to FIG. 2, which illustrates one of the source arrays 8 as mounted on the printed circuit board 14. It is to be understood that the arrangement of the other source array 10 is identical.

The source array 8 consists of a large number of discrete sources 9, such as unencapsulated LEDs. The source array 8 is made up of a number of different groups of the light sources 9, each group generating light at a different peak wavelength. Such an arrangement is described in Swiss patent number 634411, incorporated herein by reference.

In this preferred embodiment there are six such groups, consisting of four groups of sources generating light at four different infra-red wavelengths, and two groups of sources generating light at two different visible wavelengths (red and green). The wavelengths used are chosen with a view to obtain a great amount of sensitivity to banknote printing inks, hence to provide for a high degree of discrimination between different banknote types, and/or between genuine banknotes and other documents.

The sources of each colour group are dispersed throughout the linear source array 8. The sources 9 are arranged in the sets 11 of seven sources, all sets 11 being aligned end-to-end to form a repetitive colour sequence spanning the source array 8. A green LED is capable of generating only approximately half the detector output as an equivalently-located red or infra-red LED. Therefore in order to at least generally match the outputs of all LEDs with an optimal detector input intensity, two green LEDs, and only on LED of each other wavelength, are provided in each set 11.

Each colour group in the source array 8, and in the case of the green colour group, each group consisting of one of the two green sources 9 in each set 11, is made up of two series of ten sources 9 connected in parallel to a current generator 13. Although only one current generator 13 is illustrated, seven such generators are therefore provided for the whole array 8. The colour groups are energised in sequence by a local sequencer in a control unit 32, which is mounted on the upper surface of printed circuit board 13. The sequential illumination of different colour groups of a source array is described in more detail in U.S. Pat. No. 5,304,813 and British patent application No. 1470737, which are incorporated herein by reference.

The input currents provided to the light sources in source arrays 8 and 10 are intermittently calibrated for each detector to a level which would provide uniformity in the detected intensity between different detectors when light is reflected from a reference surface positioned immediately below the transport plane in which the banknote 2 moves.

During calibration, the optical intensities detected by each detector under a standard reference output from each colour gruop are evaluated to determine the detector output. This detector output is used to calculate a calibrated current level to be supplied to the sources of the same colour group of the source arrays 8 and 10 when being sensed by the same detector. The calibrated current levels calculated for each colour group and for each detector are stored in a local RAM in control unit 32, which values are converted to analogue signals using digital to analogue converters to set the relevant current generator levels during banknote sensing.

During banknote sensing all six colour groups are energised and detected in sequence during a detector illumination period for each detector in turn.

Thus, the detectors 12 effectively scan the diffuse reflectance characteristics at each of the six predetermined wavelengths of a series of pixels located across the entire width of the banknote 2 during a series of individual detector illumination periods. As the banknote is transported in the transport direction 6, an entire surface of the banknote 2 is sensed by repetitive scanning of strips of the banknote 2 at each of the six wavelengths. The sensed intensities are amplified, converted to digital signals and the acquired data is transferred to a main memory in control unit 32.

A validation algorithm, such as that disclosed in European patent application No. 0560023, is used to evaluate the acquired data in control unit 32. By monitoring the position of the banknote during sensing with an optical position sensor located at the entrance to the transport mechanism used, predetermined areas of the banknote 2 which have optimum reflectance characteristics for evaluation are identified. The sensed reflectance characteristics of the banknote in those areas are compared with that of stored reference values in order to determine whether the banknote falls within predetermined acceptance criteria, whereupon a validation signal is produced by control unit 32.

The banknote 2 can be transported in any skew and/or offset position beneath the head 4. This embodiment ensures that the homogeneity of the illumination/detection arrangement of optical sensing module 4 is such that if the same area of a banknote were to be sensed via different detectors in detector array 12, virtually identical sensed data would be produced. It is for this reason that the various measures taken to deliver improved homogeneity in illumination and detection are of importance.

Reference is now made to FIGS. 3–8, which illustrate a practical realisation of a banknote validating apparatus including detector sensing modules as schematically illustrated in FIG. 1. Components already described in relation to FIG. 1 will be referred to by identical reference numerals. These components of the banknote sensing module 4 operate in the fashion already described in relation to FIG. 1.

Figure 3:
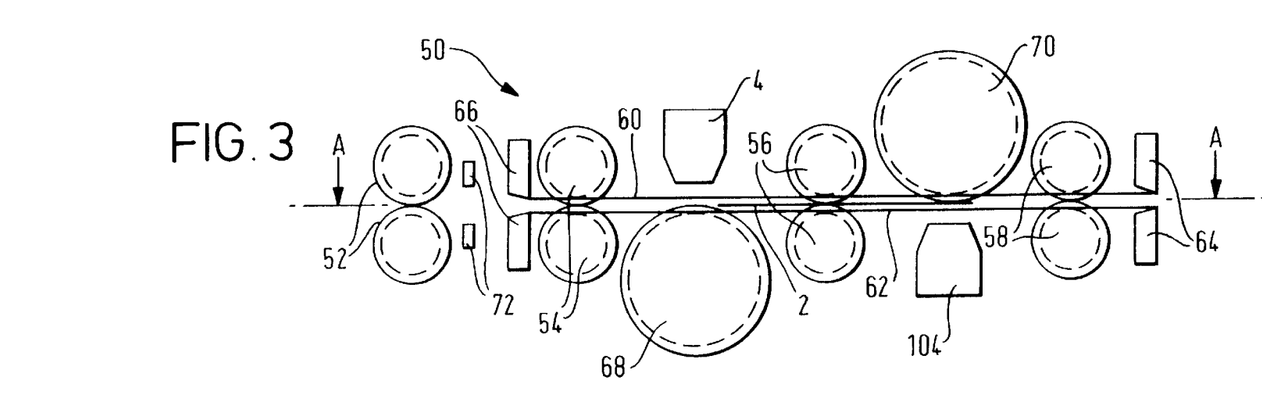
FIG. 3 shows a side view of components of a transport mechanism suitable for use with the present invention.

FIG. 3 shows a banknote validation apparatus 50 similar to that described in International patent application No. WO 96/10808, incorporated herein by reference. The apparatus has an entrance defined by nip rollers 52, a transport path defined by further nip rollers 54, 56 and 58, upper wire screen 60 and lower wire screen 62, and an exit defined by frame members 65 to which the wire screens are attached at one end. Frame members 66 support the other end of the wire screens 60 and 62.

Figure 4:
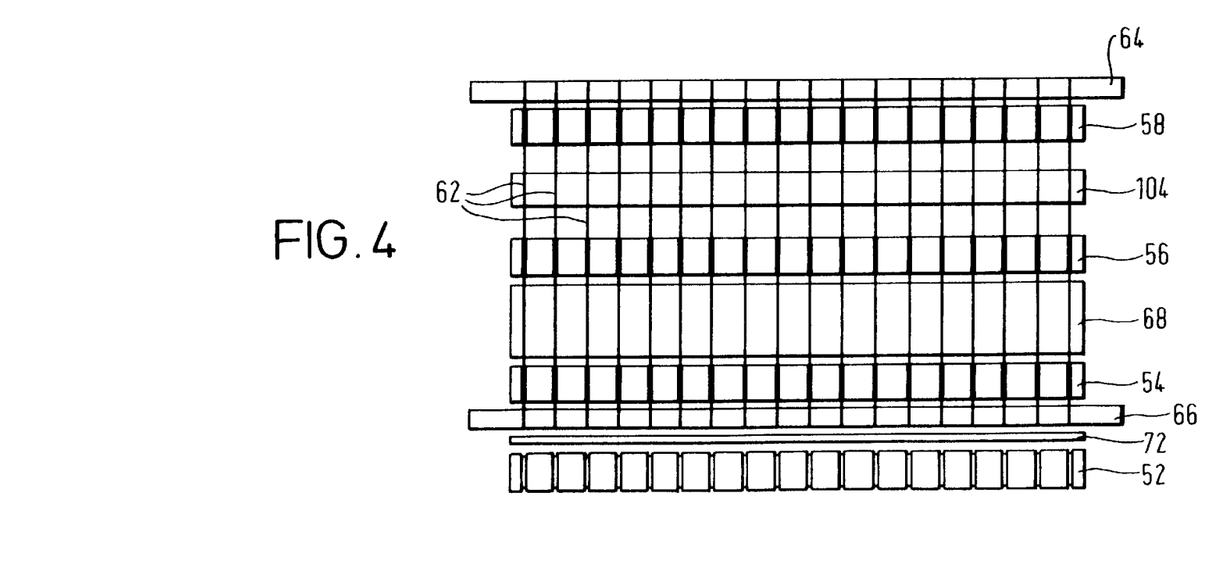
FIG. 4 shows a cross sectional view across plane A—A of the apparatus shown in FIG. 3.

An upper sensing module 4 is located above the transport path to read the upper surface of the banknote 2, and a lower sensing module 104 is located, horizontally spaced from said upper sensing module 4 by nip rollers 56, below the transport path of the banknote 2 to read the lower surface of the banknote 2. Reference drums 68 and 70 are located opposedly to the sensing modules 4 and 104 respectively so as to provide reflective surfaces whereby the sensing devices 4 and 104 can be calibrated. Each of nip rollers 54, 56 and 58 and reference drums 64 and 66 are provided with regularly-spaced grooves accommodating upper and lower wire screens 60 and 62. This is more clearly illustrated in FIG. 3, which shows the half of the apparatus located below the transport plane. Lower wire screen 62 consists of a plurality of evenly spaced guide wires along which a banknote is driven by nip rollers 54, 56 and 58.

An edge detecting module 72, consisting of an elongate light source (consisting of an array of LEDs and a diffusing means therefor) located below the transport plane of the apparatus 50, a CCD array (with a self-focussing fibre-optic lens array) located above the transport plane and an associated processing unit, is located between entrance nip rollers 52 and the entrance wire supports 66. Such an edge detecting module is described in the co-owned and co-pending International patent application filed on even date herewith, entitled "Optical Sensing" and having Agent's Reference J25224 WO, claiming priority from British patent application No. 9600825, and which is incorporated herein by reference. The edge detecting module 72 repeatedly detects the lateral edges of a banknote as it moves through the edge detecting module 72, in order to provide the validation apparatus with accurate positional information with regard to the banknote as it enters the transport mechanism. The banknote travels with a generally constant disposition through the validation apparatus 50 thereafter, the constancy in disposition being aided by the upper and lower wire screens 60 and 62. The disposition of the banknote within the apparatus is monitored with a movement encoding wheel associated with the transport mechanism. Thus, the transport condition of the banknote can be monitored at all times during sensing, such that the detector positions corresponding to discrete areas of the banknote to be sensed can be readily identified. Therefore, when validating a banknote the control unit validates the reflectance characteristics of the banknote in discrete areas by selecting a combination of detector outputs according to the location of those areas on the banknote and the disposition of the banknote within the transport mechanism.

Figure 5:
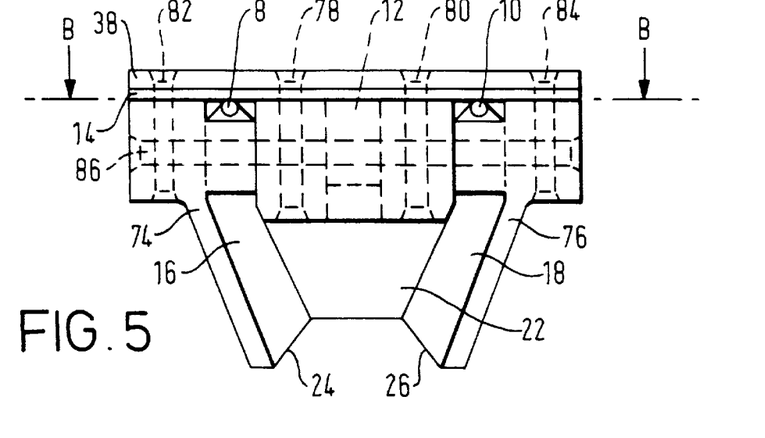
FIG. 5 shows an end view of an optical sensing device for use in the arrangement of FIG. 3.
Figure 7:
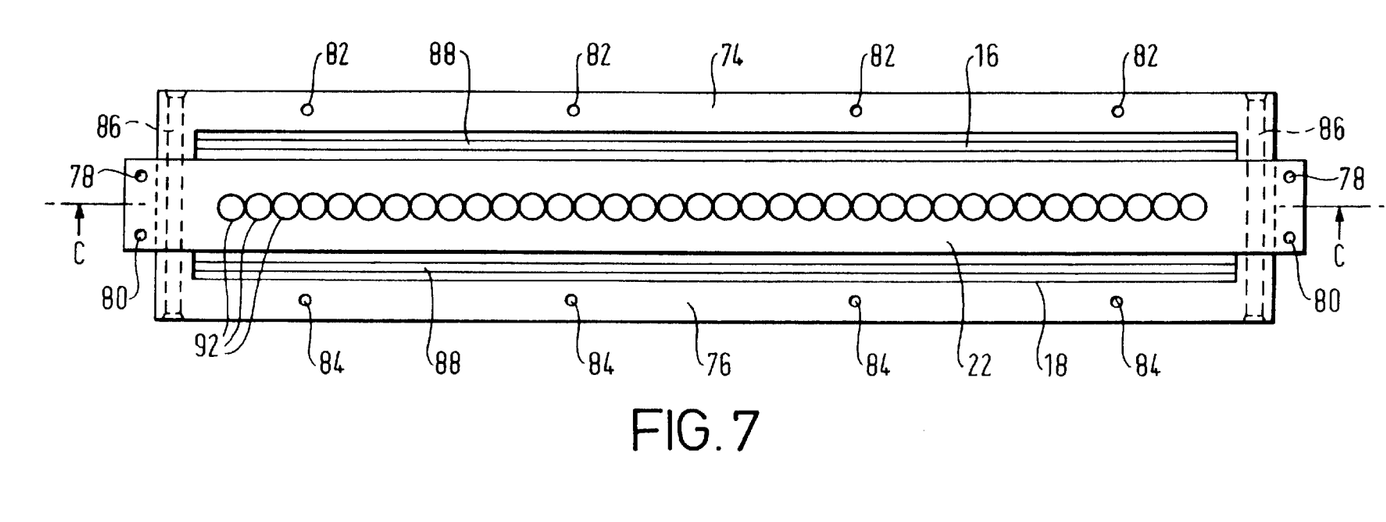
FIG. 7 shows a cross sectional view across plane B—B the device of FIG. 5.

Referring now the FIGS. 5 and 7, the sensing module 4 comprises printed circuit board 14, on the underside of which LED source arrays 8 and 10 and pin diode detector array 12 are mounted. The printed circuit board is opaque, rather than partially transparent as is generally the case with printed circuit boards, in order to prevent the transmission of light directly from the sources 8 and 10 to the detectors 12. The plexiglass light guides 16 and 18 are bonded with flexible silicone adhesive (allowing for unmatched thermal expansion rates) to the printed circuit board 14 and firmly held between an inner support 22 and outer supports 74 and 76. Inner and outer supports 22, 74 and 76 are formed of moulded plastics material.

Because the inner and outer sides of the light guides 16 and 18 are metallised, as are the lateral end faces, the physical contact which occurs between the inner and outer supports 22, 74 and 76 with the light guides 16 and 18 does not deleteriously affect the internal reflectivity of the sides of light guides.

The components of the module 4 are held in place by fixings such as screws. Vertical fixings 78 and 80 firmly bind inner support 22 to the printed circuit board 14 and its frame 38, whereas outer supports 74 and 76 are fixed to the printed circuit board frame 38 by fixings 82 and 84. A horizontal fixing 86 passes through both the outer supports 74 and 76 and the inner support 22. A centrally-located projection (not shown) is formed on one side of each of the light guides 16 and 18, providing a centered alignment of the light guides and allowing regular and symmetrical thermal expansion and contraction of the light guides.

Figure 6:
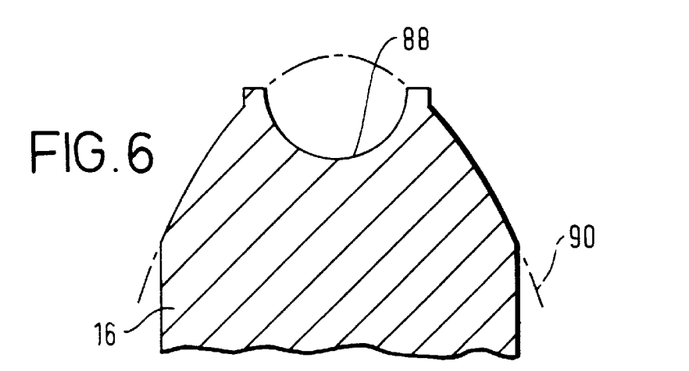
FIG. 6 shows a detailed cross sectional view of the light-receiving end of one of the light guides illustrated in FIG. 5.
Figure 9:
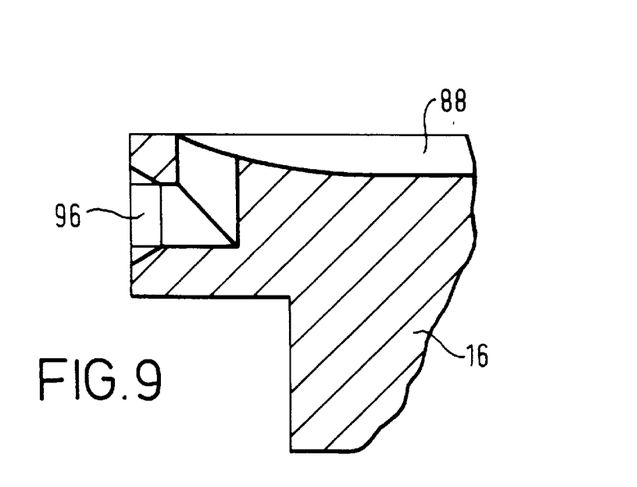
FIG. 9 shows a cross-sectional view of one lateral end of a light guide groove.

Referring now to FIG. 6, it will be seen that the light-receiving end of the light guide 16 (which is identical to the light-receiving end of light guide 18) is provided with a longitudinal groove 88 of semi-circular cross section. These semi-circular grooves 88 accommodate the LED arrays 8 and 10, and are filled with a silica gel of refractive index matched with the light guides 16 and 18. As previously mentioned, the LEDs themselves are unencapsulated dies. The grooves 88 are filled with the silicon gel by injection via one of two orifices 96 (shown in FIG. 9 for one light guide 16) provided at either end of each light guide 16 and 18, after attachment of the light guides 16 and 18 to the printed circuit board 14. The orifices also allow for thermal expansion of the gel in the grooves 88 during use of the module 4.

To further improve the coupling efficiency, portions of light-receiving ends of the light guide 16 and 18 adjacent the grooves 88 are shaped to have a profile generally following a parabola 90 which has the light sources approximately at its focus. These parabolic portions of the light-receiving ends are also polished and metallised along with the light guide sides and lateral ends, although the light-receiving grooves 88 and the light-emitting ends 24 and 26 are uncoated.

Figure 8:
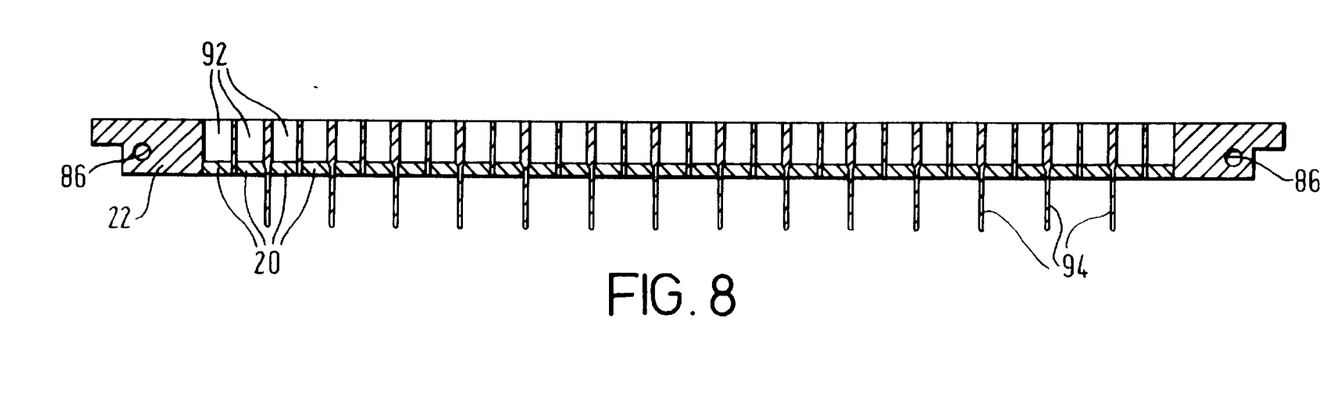
FIG. 8 shows a cross-sectional view across plane C—C of the optical support of FIG. 7.

The inner support 22 is illustrated in FIG. 8. The support 22 comprises a linear array of light-transmitting circular wells 92, lenses 20 being supported at the lower extremities of the wells 92. The wells 92 are defined by non-reflective opaque walls (the supports 22 may be made of a material such as matt black plastic). The well walls optically isolate the fields of view of adjacent detectors, which are individually located at the upper extremity of each well 92.

Inner support 22 is also provided with regularly-spaced non-reflective opaque separating walls 94 which protrude downwardly from the plane of the lenses 20 towards the transport path of the validation apparatus 50. These separating walls 94 are located to fall between two adjacent light transmitting wells 92, and are also located to coincide with the positions of the guide wires forming the wire screen 62. This reduces reflective interference from the guide wires themselves.

It should be understood that the optical sensing module, and banknote validation apparatus, described above, forms a non-limiting embodiment of the present invention.

The unitary light guide used may consist of one or more parts, providing that the light emitted by different light sources into the light guide can spread and mix as it travels along the light guide. For example, the light guide could consist of two plexiglass parts bonded at an interface with an adhesive producing an insignificant reflective index change across the boundary. The light guides in the described embodiment are formed from plexiglass However, other materials of unitary light guide would also be suitable.

One particular banknote transport mechanism has been described. However, the optical sensing device of the present invention could be employed with any other suitable transport mechanism. Similarly, suitable validation and/or banknotes type determination algorithms other than that described could alternatively be employed.

Although in the illustrated embodiment, two symmetrical arrays of light sources are utilised, only one such array could be employed.

It would be possible to detect light specularly-reflected from the banknote. However, the level of diffusely-reflected light is less dependent upon the age and condition of the banknote 2. The detection of diffusely reflected light reduces the variation of detected light intensity between banknotes of different condition.

In the described embodiment all groups of light sources are energised at detector-specific calibration levels during a single detector illumination period. Such detector-specific calibrated levels could also be achieved by a different illumination sequence, such as illumination of all detectors in turn during a single colour group illumination period. If detector-specific calibrated levels are not required, all detector outputs could be monitored simultaneously.

It will be appreciated that convex profiles other than a parabolic profile could also be used to improve coupling efficiency at the light-receiving ends of the light guides.

Although the different groups of light sources are energised in sequence in the described embodiment, it would also be possible to energise each group in parallel, using frequency modulation to discriminate between the various spectral responses.

Various other modifications and equivalents could be employed without departing from the spirit or scope of the present invention.

It will be appreciated that the term "light" used in the foregoing is not limited to visible light, but includes all forms of electromagnetic radiation, in particular that of wavelengths at which a document is not entirely transparent.

What is claimed is:

1. A device for sensing the optical characteristics of a document moving relative to the device in a transport path, said device comprising:
    a plurality of groups of light sources, each said group generating light of a different wavelength and the light sources of each said group being spaced across a light-generating area optically coupled to said transport path by a first light path;
    a plurality of light detectors spaced across a light-detecting area optically coupled to said transport path by a second light path different to said first light path, said light detectors being arranged to receive light from a plurality of discrete detection areas on said transport path; and
    a unitary light guide defining at least part of said first light path, said light guide having a light-receiving end, reflective sides, and a light-emitting end, wherein the said light generating area is optically coupled to the light-receiving end of the light guide, the light guide conveying light generated by each of said light sources towards said transport path.

2. A device according to claim 1, wherein said light-detecting area is located remote from said light generating area.

3. A device according to claim 1, wherein said light detectors are arranged to receive light, originating from said light sources, when diffusely reflected from a document travelling along said transport path.

4. A device according to claim 1, wherein the field of view of each of said light detectors is restricted by light shielding means located between the light detecting area and the transport path.

5. A device according to claim 1, wherein said light guide has at least one metallised surface.

6. A device according to claim 5, wherein said light sources are arranged in a linear array, and said light guide has metallised sides located adjacent each end of said linear array.

7. A device according to any of claims 1 to 6, wherein said light guide defines an indirect light path between the light sources and the transport path.

8. A device according to claim 7, wherein said path is dog-legged in cross section.

9. A device according to claim 1, wherein said light sources are unencapsulated LEDs.

10. A device according to claim 1, wherein said light sources are optically coupled to said light-receiving end of the light guide via a substance, such as a gel, having a refractive index generally matched to that of the light guide.

11. A device according to claim 1, wherein portions of the outer surface of said light-receiving end of the light guide follows a generally convex profile in cross section, so as to focus said light sources into the light guide.

12. A device according to claim 11, wherein said profile is generally parabolic.

13. A device according to claim 1, wherein said light sources and said light detectors are arranged on a common substrate.

14. A device according to claim 13, wherein said common substrate is a printed circuit board.

15. A device according to claim 14, wherein said printed circuit board is opaque.

16. A device according to claim 14, further comprising a control unit mounted on the same printed circuit board.

17. A device according to claim 16, wherein said control unit is located on a surface of the printed circuit board opposite to that to which the light sources and/or the light detectors are mounted.

18. A device according to claim 14, further comprising amplifying means for said light detectors mounted on the same printed circuit board.

19. A device according to claim 18, wherein said amplifying means is mounted to the surface of the printed circuit board opposite to that to which the light detectors are mounted.

20. A device according to claim 1, wherein said printed circuit board is attached to a frame member which inhibits flexing of the printed circuit board.

21. A device according to claim 1, wherein each of said groups of light sources is arranged to be energised during a detector illumination period associated with each of said detectors, each of said detectors being illuminated in turn.

22. A device according to claim 21, wherein the current supplied to each of said sub-groups is individually calibrated for each detector.

23. A device according to claim 1, comprising a further plurality of light sources and a further unitary light guide directing the light produced by each of said further plurality of light sources towards said transport path.

24. A device according to claim 1, wherein said light sources are arranged to form a linear source array and said light detectors are arranged to form a linear detector array disposed parallel to said source array.

25. A device for use in sensing the optical characteristics of a banknote moving relative to the device of a transport path, said device comprising a plurality of light sources, a unitary light guide optically coupling said light sources to one side of said transport path, and a plurality of detectors optically coupled to the same side of the transport path externally of said light guide to receive light from said light sources when reflected from a document travelling along said transport path.

26. A device according to claim 25, further comprising position-sensing means for sensing the position of said document, and processing means, responsive to said plurality of detectors and said position-sensing means, for judging said document.

27. A sensing device comprising:
means for sensing the disposition of a banknote travelling in any of a plurality of possible dispositions along a transport path;
a plurality of detectors for sensing a characteristic of the banknote in different regions spaced across said transport path; and
processing means connected to said detectors so as to be capable of processing the outputs of one or more of said detectors in a plurality of possible combinations, said processing means being arranged to select one of said possible combinations, responsive to said disposition-sensing means, for use in judging said banknote.

28. An optical banknote sensing device comprising a light guide attached to a substrate by means allowing unmatched thermal expansion between said light guide and said substrate.

29. An optical sensing device according to claim 28, wherein said attachment means comprises an elastic adhesive allowing said unmatched expansion.

30. An optical sensing device according to claim 28, wherein said light guide comprises a centrally-located protuberance for ensuring a symmetrical thermal expansion/contraction with respect to said substrate.

31. An optical device comprising light transducing means and light guide means optically coupling said light transducing means to a transport path along which a document is transportable, wherein said light guide means comprises at least one metallised surface.

32. An optical device according to claim 31, wherein said light transducing means comprises a plurality of light transducing elements arranged in a linear array, and said light guide means has metallised sides located adjacent each end of said linear array.

33. An optical device for a sensing a document comprising light transducing means and light guide means optically coupled to said light transducing means at a coupling end, said coupling end having portions following a generally convex profile in cross section, for an increased focusing effect, said portions comprising a groove to accommodate the light transducing means.

* * * * *